United States Patent [19]
Tomasini et al.

[11] Patent Number: 5,528,683
[45] Date of Patent: Jun. 18, 1996

[54] METHOD AND CIRCUIT FOR IMPLEMENTING AN IMPEDANCE, IN PARTICULAR FOR DC TELEPHONIC APPLICATIONS

[75] Inventors: Luciano Tomasini; Rinaldo Castello, both of Milan, Italy

[73] Assignee: SGS-Thomson Microelectronics S.r.l., Milan, Italy

[21] Appl. No.: 425,228

[22] Filed: Apr. 17, 1995

Related U.S. Application Data

[63] Continuation of Ser. No. 120,604, Sep. 13, 1993, abandoned.

[30] Foreign Application Priority Data

Sep. 14, 1992 [EP] European Pat. Off. .............. 92830480

[51] Int. Cl.⁶ ...................................................... H04M 1/00
[52] U.S. Cl. ............................ 379/398; 379/394; 379/405
[58] Field of Search ..................................... 379/398, 405, 379/394, 387; 323/315, 246

[56] References Cited

U.S. PATENT DOCUMENTS 4,300,023 11/1981 Kelley et al. ............................ 379/405
4,485,341 11/1984 Welty et al. ............................. 379/405

FOREIGN PATENT DOCUMENTS

| | | |
|---|---|---|
| 0260752 | 9/1987 | European Pat. Off. . |
| 0412560A2 | 8/1990 | European Pat. Off. . |
| WO83/01163 | 3/1983 | WIPO . |

Primary Examiner—Jeffery Hofsass
Assistant Examiner—Jacques M. Saint-Surin
Attorney, Agent, or Firm—David V. Carlson; Bryan A. Santarelli; Seed and Berry

[57] ABSTRACT

The invention relates to a method and circuit for implementing an impedance associated with a monolithically integrated telephone subscriber circuit connected to a telephone line having a pair of terminals. The circuit consists of a resistor connected serially to one terminal of the telephone line, and a series of current mirror circuits. The current mirror circuits are connected in a closed loop configuration to the one terminal of the telephone line. The current mirror circuits divide, by a predetermined factor, the value of the resistor when a DC or very low frequency signal is input to the telephone circuit.

23 Claims, 2 Drawing Sheets

METHOD AND CIRCUIT FOR IMPLEMENTING AN IMPEDANCE, IN PARTICULAR FOR DC TELEPHONIC APPLICATIONS

CROSS-REFERENCE TO RELATED APPLICATION

This application is a continuation of U.S. patent application Ser. No. 08/120,604, filed Sep. 13, 1993, now abandoned.

TECHNICAL FIELD

This invention relates to a circuit and method for implementing an impedance associated with a telephone subscriber circuit connected to a twisted-pair telephone line.

BACKGROUND OF THE INVENTION

Many applications require a predetermined DC or very low frequency resistive value be synthesized from another given resistance or impedance value.

The need for this is felt especially in telephone applications and speech circuits.

Such circuits are, in fact, required to have different resistances or impedances, depending on whether the signal to be processed is a DC or AC signal.

In this respect, each telephone company administration sets the values for these two different impedances, and the values change with the companies. For instance, for DC resistance, values in the 20 to 100 Ohms are generally provided by most telephone circuits, whilst values in the 200 to 1400 Ohms are provided for AC resistance.

Further, a frequent requirement is that the AC impedance be a complex type.

Heretofore, these two different impedances have been implemented by a complex structure external to the telephone integrated circuit using, moreover, comparatively expensive precision components. One prior approach uses a capacitor outside the telephone integrated circuit. This capacitor is DC operated in an open loop, and under these conditions, it has a low impedance value across it, set to approximately 30 Ohms.

Beyond a certain frequency, the capacitor becomes the equivalent of a short by completing a control and amplification loop internal of the integrated circuit. The completion of the control loop basically allows the previous impedance value to be stepped up to 600 Ohm.

While achieving its objective, this prior approach has a drawback in that, since the capacitor should be able to short out already at a low frequency, its value must be quite high, thereby making the integration of said capacitor to the circuit either inconvenient or impossible.

This prior system requires, however, pins be added to the integrated circuit to which the capacitor is connected, resulting in higher cost as well as lower reliability.

A second, more complicated prior approach is described in an article "A software programmable CMOS telephone circuit", IEEE Journal of Solid-State Circuits, Vol. No. 7, July, 1991, wherein reference is made to a telephone circuit equipped with no less than six external components.

This second approach provides for two different impedances, DC and AC, to be implemented by two discrete control loops. The two signal components are separated by two external decoupling capacitors.

But even this prior approach is beset with the same drawbacks previously considered.

SUMMARY OF THE INVENTION

The underlying technical problem of this invention is to provide a method and a circuit for implementing an impedance, which overcomes the drawbacks mentioned above.

This technical problem is solved by a method as defined in the claims. The technical problem is also solved by a circuit described in detail herein and defined in the claims.

BRIEF DESCRIPTION OF THE DRAWINGS

The features and advantages of a method according to the invention will become apparent from studying the following detailed description of an embodiment thereof, given by way of example and not of limitation in connection with an impedance synthesizing circuit implementing it, as illustrated in the accompanying drawings.

In the drawings.

DETAILED DESCRIPTION OF THE PRESENTLY PREFERRED EXEMPLARY EMBODIMENT

Figure 1:
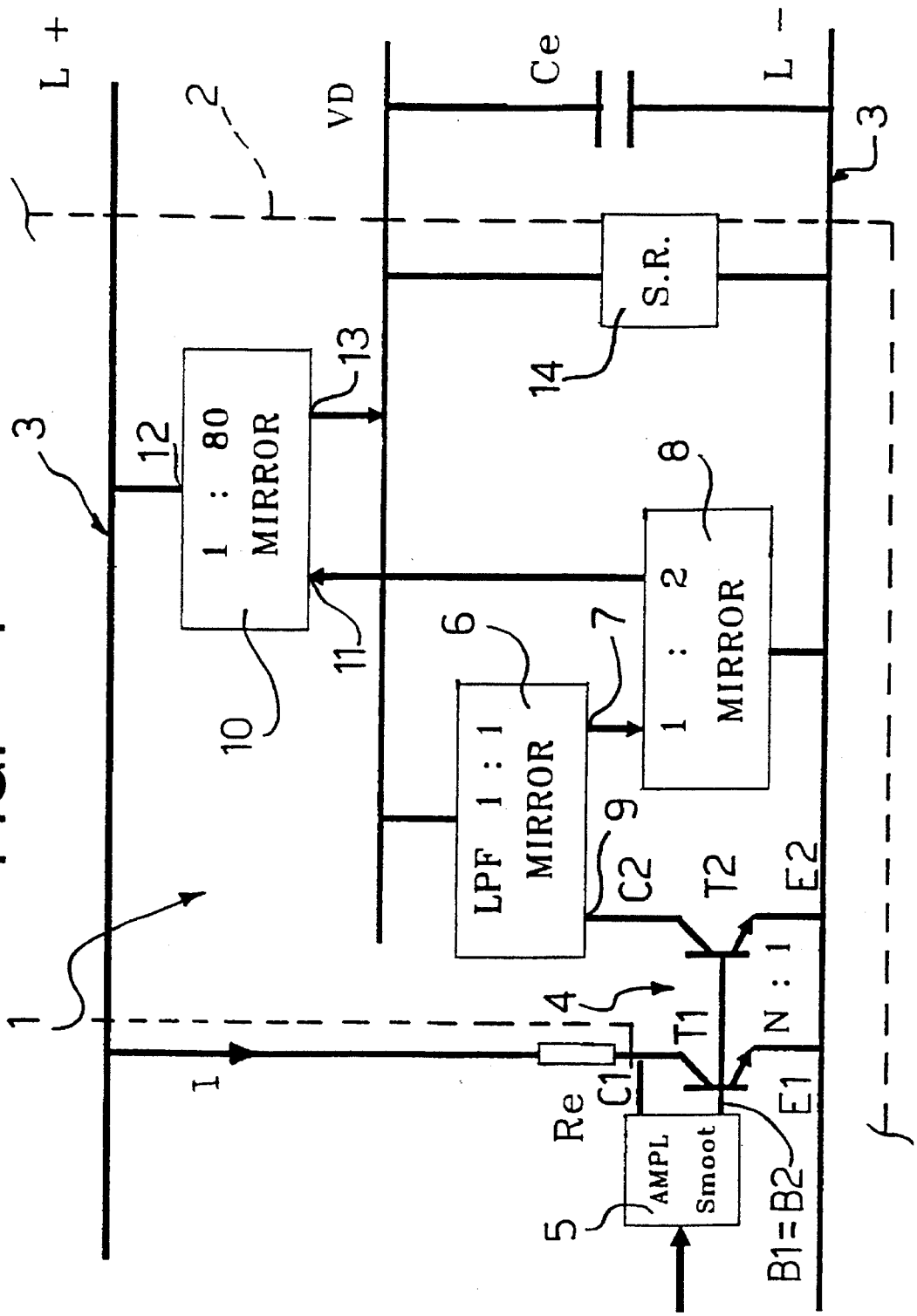
FIG. 1 is a diagrammatic view of a circuit according to the invention for implementing an impedance in DC applications; and, FIG. 2 is a diagrammatic detail view of a circuit in FIG. 1.

Referring to FIG. 1, a circuit 1 according to the invention for implementing an impedance is shown in association with a telephone speech circuit 2. The field of application of this invention is particularly, but not solely, related to telephone speech circuits incorporated to telephone subscriber apparatus, and reference will be made herein to that field of application for the sake of simplicity.

More particularly, the circuit of this invention is adapted to synthesize a complex impedance which can function both as a DC and an AC impedance.

The telephone circuit 2 is a monolithically integrated type and is connected to a telephone subscriber line 3 of the twisted pair type having a pair of terminals L+ and L−.

Later in this description, the first of said terminals, designated L+, will be considered to be the telephone signal receiving terminal, and the second, designated L−, a signal reference or ground.

Advantageously, the circuit 1 of this invention is implemented as a feedback loop and comprises a single resistor Re, preferably a 250-Ohm precision resistor connected serially to the line, with one end being connected to the first terminal L+. A current I flows through this terminal L+ to the resistor Re.

The other end of the resistor Re is connected to an input leg of a first, current-mirror circuit portion 4.

Specifically, this resistor is connected to the collector C1 of a first bipolar transistor T1 which has its emitter connected to the second line terminal L−.

The transistor T1, which is of the npn type, has its base B1 in common with the base B2 of a second, npn bipolar transistor T2 having its emitter E2 connected, in turn, to the terminal L− of the line 3.

The collector C2 of the second transistor T2 constitutes the output leg of the current mirror 4.

The area ratio of transistor T1 to T2 is arranged to be N:1 in order to allow a current N times lower than line current I to be transferred to the output leg.

Provided between the base B1 and the collector C1 of the first transistor T1 is also an amplifier driver block 5. The amplifier block 5 is not operated on DC, however under such conditions, its output to the collector C1 would be set to the desired DC value and have a very low output impedance.

The output leg of the mirror 4 is connected to an input 9 of a second current mirror 6 which is also constructed to function as a low-pass filter. The filter 6 will be described in greater detail with reference to FIG. 2.

The filter 6 receives a stabilized DC supply voltage VD to be explained. The filter 6 also has an output 7 connected to the input side of a third current mirror 8 being connected to the second line terminal L−.

This third mirror 8 also performs a two-factor multiplication of the input current.

The circuit 1 includes a fourth current mirror having an input 11 connected directly to the output of the third mirror 8. The current mirrors 8 and 10 are of a type generally known. Those skilled in the art may select from any such current mirrors and use currently available designs which are suitable for use in the present invention.

A second input 12 of the fourth mirror 10 is connected to the first terminal L+of the line 3 to directly pick up the line current I. It should be also noted that a high multiplication factor, preferably 80, is selected for the fourth current mirror 10.

Further, the output 13 of the fourth current mirror 10 is connected to one end of a capacitor Ce external to the integrated circuit 2 which has the other end connected to the second line terminal L−.

Picked up across the capacitor Ce is the supply voltage VD as suitably stabilized and supplied to both the second mirror 6 and the other internal components of the circuit 2.

The circuit 1 includes a shunt regulator block 14 in parallel with the capacitor Ce, which functions to fetch current for stabilizing the voltage value VD.

Figure 2:
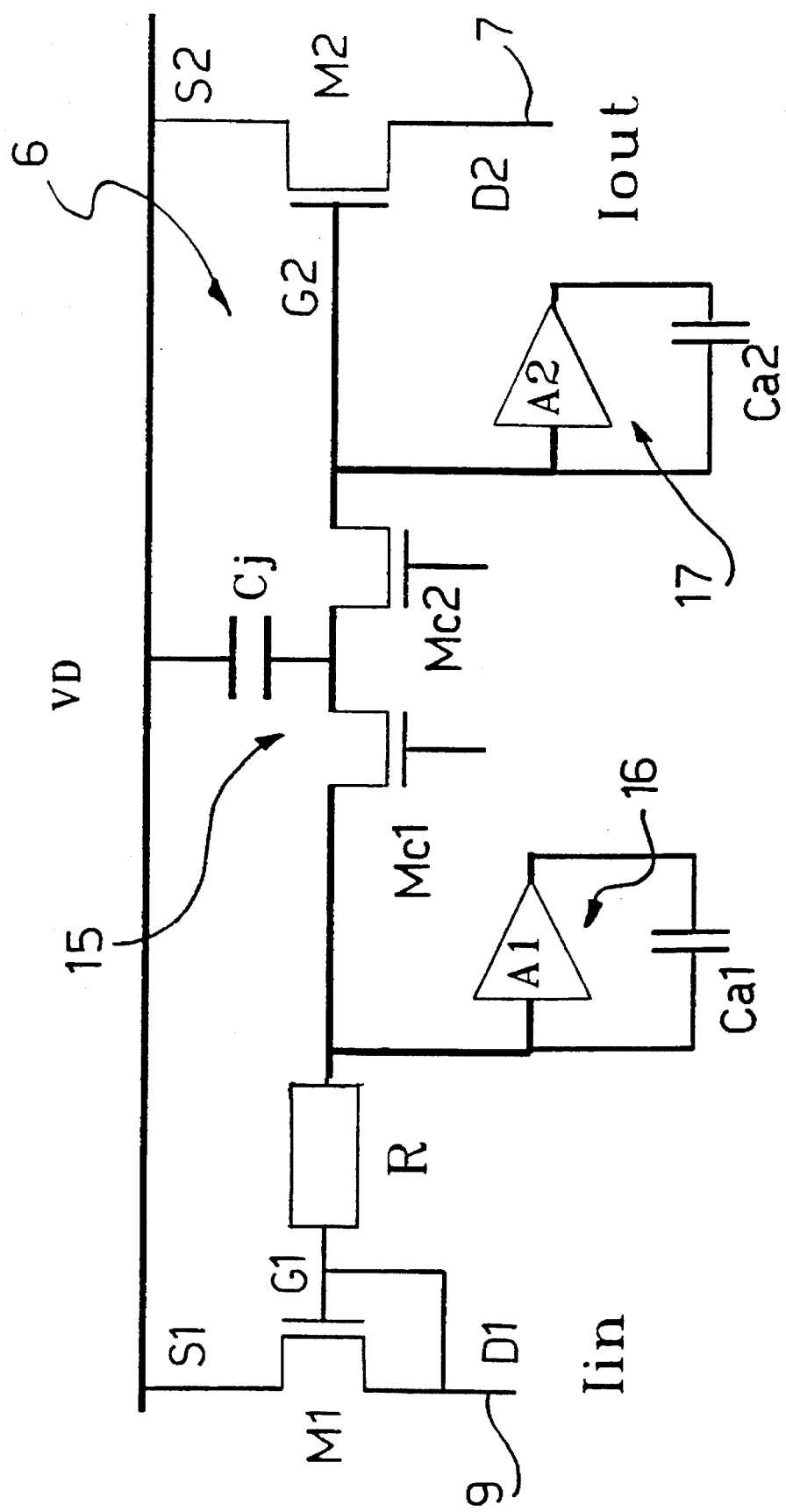

The construction of the second current mirror 6 with low-pass filter functions will now be described with specific reference to the example in FIG. 2.

The input 9 of the filter 6 comprises the drain terminal D1 of a P-channel MOS transistor M1 which is connected into a diode configuration with the respective gate G1 and drain D1 terminals connected together.

The source S1 of this transistor M1 is connected to the voltage supply VD.

A resistor R has one end connected to the gate terminal G1 of the transistor M1 and the other end connected to a first low-pass filter 16. The first low-pass filter 16 has antialiasing functions to suppress any intermodulation noise. The filter 16 comprises essentially an operational amplifier A1 having its output fed back by being connected to the input side through a capacitor Ca1.

Another filter 15, preferably of the switched capacitor type, is downstream connected to this first filter 16. The filter 15 comprises a pair of MOS transistors Mc1 and Mc2 and a capacitor Cj connected between such transistors and the voltage supply VD.

This switched-capacitor filter 15 introduces a so-called pole at a very low frequency, below one Hertz, into the frequency response of the mirror 6. Switched-capacitor filters are well known to those skilled in the art, and such filters may be selected from any currently available which are suitable for use in the present invention.

The structure of the mirror 6 is completed by a second low-pass filter 17 which comprises an amplifier A2 feedback connected through a capacitor Ca2. Lastly, a second MOS transistor M2 is incorporated to the mirror 6 with its gate terminal G2 being connected after the last filter. The second transistor M2 has its source terminal S2 connected to the voltage supply VD and its drain D2 arranged to constitute the output 7 of the mirror 6.

The transistors M1 and M2 are the same size, and accordingly, the current mirror 6 has unity DC gain. The method of implementing impedance according to the invention will now be described.

The line current I flowing through the resistor Re is first mirrored to a reduction ratio of N:1, to thereby reduce the power consumption of the telephone circuit 2. The transistors T1 and T2 in the mirror 4 perform this scaling down of the current I.

The current Iin at the input 9 of the current mirror 6 is, therefore, equal to I/N and voltage-wise transformed by the MOS transistor M1, which is connected in diode configuration.

This voltage is filtered by the first low-pass filter 16 with antialiasing functions, and further filtered by the switched-capacitor filter 15.

This voltage is converted back to a current Iout by the MOS transistor M2 located at the output of the current mirror 6.

Presently, the current Iout at the output 7 flows first through the current mirror 8, where it is multiplied by a factor of two, and then to the current mirror 10 where it is multiplied by a factor of eighty.

Summarizing, the value "N" of the first current mirror 4 is selected so as to provide an appropriate impedance depending upon the impedances required for a particular telephone circuit design, and in one embodiment N is selected as 40. The value N can be selected over a range of values to provide the required impedance for a particular telephone circuit as will be apparent to those of skill in the art. If a current I flows through the resistor Re, then the feedback effect enacted by the circuit 1 will draw from the terminal L+of the line 3 a current equal to, (80 * 2/40) * I=4 * I The overall current draw of the circuit will, therefore, be equal to 5*I and be the equivalent of dividing the resistance Re by a factor of five.

Since a value of 250 Ohms has been selected for the resistance Re, the DC resistance as seen from the line terminal L+is one fifth that value, i.e. 50 Ohms.

In essence, the method of this invention arranges for the resistance Re, that is the single external component of the integrated circuit 2, to be divided by a factor of five through the control loop represented by the circuit 1 feedback.

The values taken by the impedance as seen from the line terminal L+conform, both DC and AC-wise, with the requirements of the various telephone companies.

In addition, the DC impedance value may be altered to suit individual circuit requirements by acting on the multiplication ratii of the current mirrors 8 and 10. This can be simply arranged by changing the area ratio of the MOS transistors M1, M2 at the input and the output of the mirror 6.

The circuit of this invention solves the technical problem discussed above and affords a number of advantages, including the use of a single external component of a discrete type, namely the resistor Re. This resistor Re is also utilized to synthesize the AC impedance.

Another advantage of the present system is that its speed may be easily increased. This may be accomplished by shorting the gate terminals of the transistors M1, M2 in the current mirror 6.

Finally, by having the time constant of the low frequency circuit portion within current mirror 6 set by the switched capacitor filter 15, it can be compensated for more easily and accurately where its effect on the other performance features of a telephone speech circuit is to be attenuated.

We claim:

1. A method for implementing an impedance for a monolithically integrated telephone subscriber circuit associated with a telephone line having at least one pair of line terminals, the method comprising the steps of:

connecting a single resistor in series with one line terminal of the telephone line to receive an input signal from the line terminal; and connecting a series of circuit means in a closed loop between the line terminals for reducing, by a predetermined factor, a value of the resistor when the input signals are DC and when the input signals are very low frequency.

2. A method according to claim 1 wherein said predetermined factor is a factor of five.

3. A method according to claim 1 wherein said reducing is performed by successive current-mirror transformations of current flowed through the resistor.

4. A method according to claim 3 wherein a first of the current-mirror transformations provides a proportional reduction of current by a predetermined factor of N.

5. A method according to claim 3 wherein a value of said predetermined division factor can be controlled by acting on current-mirror transformation ratios.

6. A circuit for implementing an impedance associated with a monolithically integrated telephone subscriber circuit connected to a telephone line having a pair of line terminals, the circuit comprising:

a single resistor connected serially to one line terminal of the telephone line the single resistor being coupled to receive an input signal; and a loop circuit incorporating a series of current mirrors, the series of current mirrors being feedback connected to the one terminal, a first of said current mirrors in the series also including a low pass filter.

7. A circuit according to claim 6, wherein said low-pass filter comprises a switched capacitor filter.

8. A circuit according to claim 6, characterized in that one of said current mirrors, being connected directly to the resistor, has respective input and output legs provided with corresponding transistors showing an area ratio of N:1 to allow for transfer, to the output leg, of a current which is N times less than the current present at the input leg and being flowed through said resistor.

9. A circuit according to claim 6, characterized in that the overall gain of said current mirrors leads to multiplication by a factor of four of the current being flowed through said resistor.

10. An impedance circuit for providing an impedance to a monolithically integrated telephone subscriber circuit, the subscriber circuit coupled to a telephone line having first and second line terminals, the impedance circuit comprising:

a single resistor having first and second terminals, the first terminal connected to the first line terminal and receiving an input signal, the resistor producing a current signal;

a first current mirror coupled to the second terminal to receive the current signal from the resistor, the first current mirror reducing the current by a first predetermined value to produce a reduced current;

a low pass filter coupled to the first current mirror to receive the reduced current from the first current mirror, the low pass filter producing a current signal; and a second current mirror coupled to the low pass filter and the first line terminal to receive the filtered current signal, the second current mirror amplifying the filtered current signal.

11. An impedance circuit according to claim 10 wherein the second current mirror comprises a first amplifying current mirror coupled to the second line terminal and the low pass filter and receiving the filtered current signal, the first amplifying current mirror amplifying the filtered current signal by a first predetermined value and producing an amplified signal; and a second amplifying current mirror coupled to the first line terminal and the first amplifying current mirror and receiving the amplified signal, the second amplifying current mirror amplifying the amplified signal by a second predetermined value.

12. An impedance circuit according to claim 11 wherein the second predetermined value is greater than the first predetermined value.

13. An impedance circuit according to claim 10 wherein the low pass filter is a switched capacitor filter.

14. An impedance circuit according to claim 10 wherein the low pass filter includes a current mirror.

15. An impedance circuit according to claim 10 wherein the first current mirror comprises first and second transistors, the first and second transistors having their bases intercoupled and their emitters coupled to the second line terminal, the collector of the first transistor coupled to the second terminal, and the collector of the second transistor coupled to the low pass filter.

16. An impedance circuit according to claim 15, further comprising an amplifier driver coupled to the bases of the first and second transistors.

17. An impedance circuit according to claim 10, further comprising a capacitor connected between the second current mirror and the second line terminal.

18. An impedance circuit according to claim 10 wherein the low pass filter comprises a plurality of low pass filters.

19. A circuit for implementing an impedance associated with a monolithically integrated telephone subscriber circuit connected to a telephone line having first and second line terminals, the circuit comprising:

a single resistor connected serially to the first line terminal; and a closed loop circuit incorporating a series of at least first and second current mirrors feedback connected to said one terminal, the first current mirror including a lowpass filter.

20. An impedance circuit for providing an impedance to a monolithically integrated telephone subscriber circuit, a subscriber circuit coupled to a telephone line having first and second line terminals, the impedance circuit comprising:

a resistor having first and second terminals, the first terminal connected to the first line terminal;

a first current mirror coupled to the second terminal to receive a current signal from the resistor, the first current mirror reducing the current by a first predetermined value to produce a reduced current signal;

a low-pass filter coupled to the first current mirror to receive the reduced current signal from the first current mirror, the low-pass filter producing a filtered current signal;

a first amplifying current mirror coupled to the second line terminal and the low-pass filter and receiving the filtered current signal, the first amplifying current mirror amplifying the filtered current signal by a first predetermined value and producing an amplified signal; and a second amplifying current mirror coupled to the first line terminal and the first amplifying current mirror and receiving the amplified signal, the second amplifying current mirror amplifying the amplified signal by a second predetermined value, the second predetermined value being greater than the first predetermined value.

21. A circuit to be coupled to a telephone line having first and second line terminals, the circuit comprising:

a monolithically integrated telephone subscriber circuit, the subscriber circuit having an input terminal to be coupled to the first line terminal to receive an input signal from the first line terminal, the subscriber circuit also having:

a first current mirror circuit having a low pass filter that receives the input signal and produces a filtered current signal, and a second current mirror circuit coupled to the first current mirror circuit and coupled to the second line terminal, the second current mirror receiving the filtered current signal and producing an amplified signal.

22. A circuit according to claim 19 wherein the second current mirror of the subscriber circuit comprises a first amplifying current mirror coupled to the second line terminal and the first current mirror and receiving the filtered current signal, the first amplifying current mirror amplifying the filtered current signal by a first predetermined value and producing an amplified signal; and a second amplifying current mirror coupled to the first line terminal and the first amplifying current mirror and receiving the amplified signal, the second amplifying current mirror amplifying the amplified signal by a second predetermined value.

23. The circuit according to claim 22 wherein the low-pass filter is a switched capacitor filter.

\* \* \* \* \*